Figure 1:
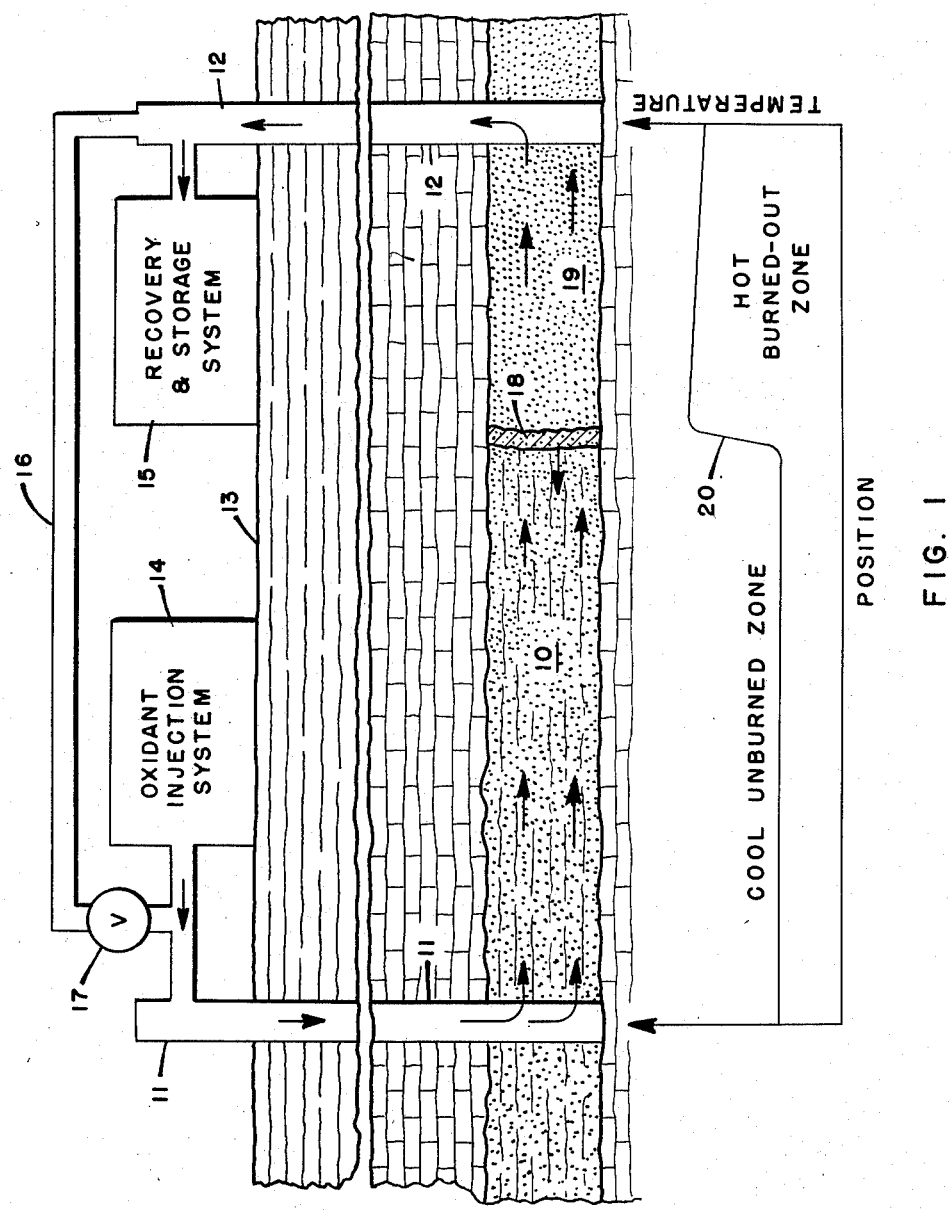

May 28, 1957 R. A. MORSE 2,793,696
OIL RECOVERY BY UNDERGROUND COMBUSTION
Filed July 22, 1954 2 Sheets-Sheet 1

INVENTOR:
RICHARD A. MORSE
BY
*Newell Pottoy*
ATTORNEY

May 28, 1957 R. A. MORSE 2,793,696
OIL RECOVERY BY UNDERGROUND COMBUSTION
Filed July 22, 1954 2 Sheets-Sheet 2

INVENTOR:
RICHARD A. MORSE
BY
ATTORNEY

United States Patent Office 2,793,696
Patented May 28, 1957

2,793,696

OIL RECOVERY BY UNDERGROUND COMBUSTION

Richard A. Morse, Tulsa, Okla., assignor to Pan American Petroleum Corporation, a corporation of Delaware Application July 22, 1954, Serial No. 445,133

5 Claims. (Cl. 166—11)

This invention relates to the recovery of oil from underground reservoirs and is directed particularly to the recovery of oil or semisolid hydrocarbons or bitumens by the combustion of a portion of the hydrocarbons in place.

A major problem in the application of underground combustion processes to oil recovery is the very high differential pressures that must often be applied between input and output wells under field conditions to obtain economic rates of flow. Very often the pressures that must be applied to shallow reservoir strata of low permeability—under 100 millidarcies—are higher than can be applied economically and without causing such fracturing of the reservoir rock as may lead to channeling and bypassing.

These high differential pressures arise in part from the fact that in the usual underground combustion process, three phases—gas, oil, and water—are simultaneously flowing through the reservoir ahead of the combustion zone. This results in the effective permeability to all three fluids being typically less than 10 percent of the permeability to a single fluid. The farther the combustion zone progresses, the longer the three-phase zone becomes, with higher and higher differential pressures required to maintain a given producing rate at the output well. Furthermore, the oil remains at reservoir temperatures where its viscosity, and hence resistance to flow through the rock, is many times higher than at elevated temperatures.

In view of the foregoing it is a primary object of my invention to provide a method of utilizing underground combustion phenomena for oil recovery so as to avoid large differential pressures or high pressures, along with their attendant costs and difficulties. Other and more specific objects may be briefly enumerated as to carry out an underground combustion process in such a manner as (1) to avoid reduction of permeability by multiple-phase flow and to make maximum use of the permeable flow channels available; (2) to recover products essentially by single-phase flow; (3) to produce substantial amounts of cracking in order to upgrade the quality of the recovered heavy oils; (4) to produce substantial amounts of oxygenated chemicals having higher market value than crude oil alone; (5) to make recovery operations possible in low permeability reservoirs; and (6) to reduce the viscosity of such oil as is not vaporized so that it flows readily. Still other and further objects, uses, and advantages of the invention will become apparent as the description proceeds.

Briefly stated, the foregoing and other objects are accomplished by an underground combustion process wherein the combustion zone is caused to propagate through the reservoir stratum in a direction which is exactly opposite to the usual direction—that is, countercurrent to the direction of flow of the oxygen-carrying gases and of the products of recovery and combustion. In other words, while the flow of the input gases and reservoir fluids is away from an input well and toward an output well, the movement of the combustion zone is just opposite to this—away from the output well toward the input well. Thus, there is surrounding each output well a heated zone through which the combustion zone has passed and through which most of the reservoir fluids, vaporized at the combustion zone, flow in the vapor state—that is, a single phase—to the output well for recovery. If any liquids are present in this zone, their viscosity is so low, due to the elevated temperature, that they contribute only in a minor way to the differential pressure between the input and output wells.

Figure 2:
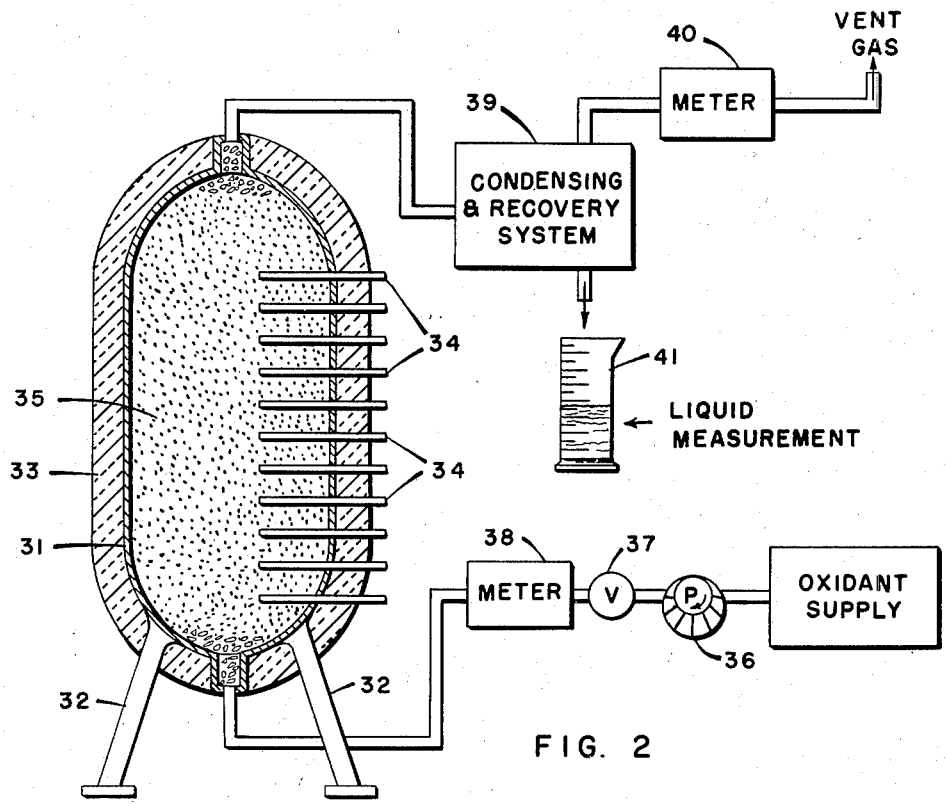
Figure 3:
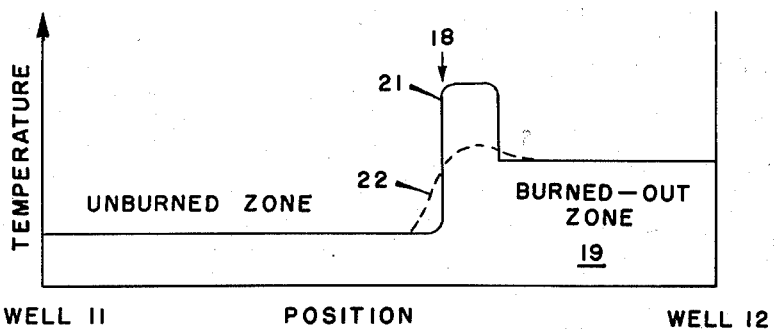

This will be better understood from the detailed description to follow and by reference to the accompanying drawings forming a part of this application. In these drawings, Figure 1 is a diagrammatic view of the process of the invention in operation in an underground stratum, together with a temperature profile taken through the stratum and correlated in position with it on the drawing;

Figure 2 is a diagrammatic view of a laboratory apparatus set up to test the invention and evaluate the effects of certain operating variables; and Figure 3 is a graph similar to that of Figure 1 showing a temperature profile characteristic of a modified form of the invention.

Referring to these drawings in detail and particularly to Figure 1 thereof, an oil-producing stratum 10 is shown as being penetrated by two wells 11 and 12 spaced some distance apart. One of these wells, say well 11, is regarded as an input well, while the other well 12 is an output or producing well from which the reservoir and other fluids are recovered. At the ground surface 13 an air or other oxidizing gas injection system 14 is connected to the well head of well 11, while a recovery system 15, which may include condensing, separating, and storage equipment not shown in detail, is connected so as to receive the output of producing well 12.

As was true of the laboratory test example which will be described later, it is to be understood that the stratum 10 is relatively permeable to the flow of gases. Furthermore, the in-place hydrocarbons are substantially not displaceable or capable of being driven forward by gas flow, as otherwise a drive by gas injection would be preferred to combustion as the method of recovery. These conditions of substantial gas permeability and immobility of the in-place hydrocarbons or bitumens are typical of a great many known oil deposits.

In the prior-art systems of underground heating or combustion, ignition is accomplished in the stratum 10 at the base of well 11, and the subsequent injection of oxygen-containing gases through this well 11 causes propagation of both a combustion zone and of the reservoir and other fluids toward the output well 12, where they are recovered. The reservoir liquids under these conditions, however, remain almost entirely in the liquid phase, as very little of the heat generated at the combustion zone is transferred ahead of it, and furthermore the amount of water present as connate water is increased by the additional water which is a product of the combustion process. To drive these liquids to an output well 12 at an economic rate may often require higher pressures than can be economically supplied and than the reservoir can withstand without the occurrence of fracturing leading to undesirable channeling and the like.

In accordance with the present invention, on the other hand, the combustion process is initiated at the base of output well 12, as, for example, by heating by means well-known in the art such as an air-gas burner the exposed face of the formation 10 in the bore of well 12 to a temperature above the ignition temperature of the oil in place, then supplying oxygen or air from the supply system 14 through a pipe line 16 controlled by a valve 17 and connected to the well head of well 12. When the combustion zone 18 thus created has been propagated a short distance from the base of well 12—for example, from 5 to 10 feet—and has built up a high temperature within the stratum 10, this temporary injection through well 12 is stopped by closing valve 17, and the oxidizing gas injection is started or continued through the input well 11.

During the temporary injection period, the gaseous combination products flowing away from well 12 through the stratum 10 are cooled by the unheated formation as soon as they leave the combustion zone 18. Thus, even though they flow through the stratum 10 to the input well 11, the substantially immobile oil in place is not displaced by the gas flow. In the five or ten-foot forward propagation of the combustion zone 18 around the well 12, only a narrow band or bank of water and displaced oil forms. This is insufficient in amount to cause substantial cooling of the heated zone around this well when the direction of gas flow is reversed and the various fluids flow back out through the well 12. Similarly, the heat capacity of the gases in the pore space of stratum 10 between the two wells is also too small to lower the temperature of the heated zone around the well 12 below the ignition temperature value during the reverse flow. Accordingly, the heated formation around well 12 remains at a temperature above the ignition temperature of the hydrocarbons in place. When, after a relatively brief period of time, the oxygen from well 11 arrives at the heated zone, the combustion reaction is promptly resumed. The combustion zone 18 continues its movement away from the well 12 and toward well 11, but this is now opposite to the direction of movement of both the oxidizing gas and the products of combustion and vaporization, both of which travel toward well 12. Typically, the temperature in the combustion zone 18 is about 1,000° F. This is sufficient to vaporize and/or thermally crack practically all of the hydrocarbons in stratum 10 which are not burned. The resulting hot oil vapors and gaseous cracked products, together with the hot gaseous reaction products of the combustion, leave the combustion zone 18 and move through the previously burned dry zone 19 in stratum 10 to output well 12, where they are taken to recovery system 15 to be cooled, condensed, and put in storage. No further combustion of the hot gases can occur during their passage through the hot zone 19, however, as the injected oxygen is completely consumed in the reactions at the combustion zone 18.

As long as the temperature of the gases leaving combustion zone 18 is high, there can be no cooling of the burned-out zone 19 surrounding output well 12 by heat transfer to these gases. On the contrary, cooling of the burned-out portion 19 of zone 10 is prevented to a considerable degree by transfer of heat from the hot gases to the rock through which they pass. Cooling of this burned-out zone 19 can thus occur substantially only by conductive loss of heat to the strata above and below stratum 10. Since this would be a slow process, even without the replenishment of the heat lost by transfer from the flowing gases, very little cooling or condensation of vapors and gases leaving combustion front 18 occurs. This results in a temperature distribution in stratum 10 as shown by the graph 20 forming the lower part of Figure 1.

Eventually, of course, with the passage of time, the size of burned-out zone 19 becomes so large that the rate of heat loss from it to the strata above and below exceeds the rate of replenishment. This permits some of the heavy hydrocarbon vapors to condense in the stratum 10 before they reach well 12. When this occurs, as may be evidenced by a substantial increase in produced gas-oil ratio, it reduces both the recovery efficiency of the process and the permeability of the stratum to the hot gases. This is usually a sign that, in this part of the reservoir, the recovery method is approaching its economic limit.

Laboratory studies of this invention have been made to ascertain the effects of some of the variable and controlling factors. For this purpose an apparatus such as is shown in Figure 2 was set up. A section of steel casing 31 sixteen inches in diameter and seven feet in length was tapered at the ends and provided with pipe connections. This left a central, constant-diameter section five feet in length. The casing 31 was supported in a vertical position on legs 32 and was insulated by a jacket 33 of thermal insulation five inches thick. Eleven thermocouple wells 34, spaced six inches apart throughout the five-foot cylindrical portion of the cell and extending nearly to the center of the cell, were available for observation of temperatures.

The cell volume was filled with flint shot Ottawa sand, ranging from 20 to 40 mesh in particle size, throughout the cylindrical cell portion, the tapered ends being graded to coarser sand and pebbles. The permeability of the sand bed thus created was about 102 darcies, and the porosity was about 37 percent.

For a typical test run, the cell 31 was first saturated by introducing 54 liters of a West Texas type "C" crude oil, which volume of oil filled about 70 percent of the pore space in the sand bed. The oil had an API gravity of about 31° and a viscosity of 8 centipoises at 80° F. Ignition was accomplished at the top end of the cell, and air was thereafter injected at a substantially constant rate of two s. c. f. (standard cubic feet) per minute at the bottom of the cell by means of a pump 36 controlled by a valve 37 in accordance with the indications of a flow meter 38. Products were taken from the top of cell 31 to a condensing and recovery system 39, from which the gases, after metering by a meter 40, were vented, while the liquids were collected and measured in a vessel 41. From time to time, samples of the vent gases and of the recovered liquids were taken for analysis.

The following is typical of the results obtained. With an air input of two s. c. f. per minute, the combustion front moved downward from the top of cell 31 through a distance of four feet at an average rate of .218 feet per hour. At the beginning of the run the pressure differential through the sand body was only 2.75 pounds per square inch, and during the run this declined to about 2.0 pounds per square inch. The gas-oil ratio of the produced fluids, of which the major portion of the gas was the nitrogen of the injected air, averaged 15,200 cubic feet per barrel of oil recovered. The water-oil ratio was .422. The average peak temperature in the combustion front as it passed the various thermocouples 34 was about 1015° F. The oil saturation burned was 12.8 percent of the pore space in the sand body. While the oil recovery of 29.4 liters represented only 54.5 percent of the original oil in place, the percentage recovery under field conditions would be substantially higher than this, as more of the light hydrocarbons, which here stayed with the vent gases, would be liquefied and recovered.

Analysis of the samples of the recovered liquid products showed significant alterations of the oil in place due to the temperature and other conditions existing in the combustion zone 18 and dry zone 19. Chemical analyses of the produced oil showed it to contain nearly 16 percent by weight of oxygenated chemicals of various kinds including carbonyls, alcohols, acids, and esters. Similarly, samples of the produced water were analyzed chemically and found to contain more than 7 percent by weight of oxygenated chemicals, on the average. The viscosity of the oil was reduced to one-half or less of its original value, indicating that substantial cracking took place. In general, on heavier oils than this, the viscosity reduction is even more marked.

The limiting rates of oxidant injection and recovery of products have not been evaluated for all possible field conditions. It is apparent, however, that the heat loss from the hot burned-out zone 19 between combustion zone 18 and well 12 is the basic factor limiting how much reservoir area can be produced from one location of the producing well 12. It is reasonable to conclude, therefore, that in a continuous process the rate of oxidant injection should be as high as the injection system 14 can provide, as long as the pressures are not so great as to cause fracturing of the reservoir.

It is to be noted, however, that the temperature of 1000° F. or higher in the combustion zone 18 and burned-out zone 19 is higher than would be desirable in some instances because it produces more cracking and generation of gaseous products than is necessary for optimum recovery of some oils. A substantial lowering of the average value of this temperature can be achieved by injecting the oxidant gas thru well 11 into formation 10 in an intermittent or "on-off" fashion. During the "on" periods of oxygen flow to zone 18, its temperature rapidly rises to the 1000° F. level or above. Then, during each following "off" period its temperature drops due to flow of heat by conduction through the rock, that portion of the heat which flows toward well 11 producing a substantial amount of vaporization and viscosity reduction of the oil in place, without combustion.

Thus, during an "on" period, the temperature profile 20 of Figure 1 becomes modified as the solid-line graph 21 of Figure 3, while the dashed line 22 of this figure represents conditions near the end of an "off" period, after most of the heat transfer has taken place. As long as the temperature at the combustion zone 18 is never allowed to fall below the ignition temperature of the oil in place—typically 300° to 500° F.—the combustion reaction starts promptly each time oxygen or air injection is resumed.

A significant feature here is the temperature of the burned-out zone, which is substantially lower than the peak temperature in the combustion zone but still high enough to maintain the bulk of the hydrocarbons to be recovered in the vapor state. Furthermore, any hydrocarbon fraction which may condense at this temperature has such a low viscosity that it can be driven through the stratum 10 by the flowing gases with a relatively small increase in differential pressure.

Another aspect of the lower average temperature of the combustion and burned-out zones is the lowered rate of heat loss to the formations above and below stratum 10 due to the smaller temperature differential. This tends to compensate, at least in part, for the lower average rate of propagation of the combustion zone 18 through stratum 10, compared to the propagation rate with continuous burning, so that the areal extent of reservoir stratum 10 from which oil can be recovered by any one producing well 12 is not reduced as much as it otherwise would be.

The frequency and relative length of the "on-off" periods of oxidant injection are variable between wide limits, and their optimum values depend on many variables such as the characteristics of the oil, the reservoir rate, the injection rate, oxidant concentration, and the like. Often, however, days or weeks may elapse between periods of oxygen injection, without the reservoir rock temperature falling below the critical ignition temperature level. Ordinarily, though, the major portion of the desired heat transfer takes place within a few days after the oxidant injection is stopped, so that in a typical operation about equal "on" and "off" periods, each of several days duration may be used.

While my invention has been described in terms of the foregoing embodiment and details, it is to be understood that it is not limited to these details or to the experimental example, as the principle involved may be used in other ways, and further modifications will now be apparent to those skilled in the art. The scope of the invention therefore should properly be ascertained from the appended claims.

I claim:

1. The method of recovering, from an underground gas-permeable stratum in which it occurs, oil which is substantially not displaceable by gas flow, said stratum being penetrated by at least two spaced wells respectively adapted for use as an input well and a producing well, which method comprises the steps of initiating a zone of combustion of the oil in place within said stratum at the bore of said producing well, supplying a gas mixture containing oxygen through said input well and thence through said stratum to said combustion zone at said output well to maintain the combustion and to propagate said zone through said stratum away from said output well and toward said input well, whereby a major portion of the in-place oil present at said combustion zone and not utilized in completely consuming said oxygen becomes vaporized by the heat of the combustion and, with the products of combustion, flows in vapor form to said output well through the zone of said stratum previously heated by the passage of said combustion zone, and cooling and recovering the fluids entering said output well from said stratum.

2. The method of recovering, from an underground gas-permeable stratum in which it occurs, oil which is substantially not displaceable by gas flow, said stratum being penetrated by at least two spaced wells respectively adapted for use as an input well and a producing well, which method comprises the steps of initiating combustion of the oil-in-place in said stratum at the bore of said producing well, temporarily supplying oxygen-containing gas through said producing well to maintain said combustion and to propagate a combustion zone through said stratum away from said producing well, discontinuing said temporary oxygen-supplying step when said zone has propagated a short distance from said producing well and thereafter supplying oxygen-containing gas through said input well and thence through said stratum to said combustion zone to continue to propagate said zone through said stratum away from said output well and toward said input well, whereby a major portion of the in-place oil present at said combustion zone and not utilized in completely consuming said oxygen becomes vaporized by the heat of the combustion and, with the products of combustion, flows in vapor form to said output well through the zone of said stratum previously heated by the passage of said combustion zone, and cooling and recovering the fluids entering said producing well from said stratum.

3. In the method of recovering, from an underground gas-permeable stratum in which its occurs, oil which is substantially not displaceable by gas flow, said stratum being penetrated by at least two spaced wells respectively adapted for use as an input well and a producing well, the improvement which comprises the steps of initiating a combustion zone within said stratum, at a point remote from said input well, supplying oxygen-containing gas through said input well and thence through said stratum to said combustion zone to maintain said combustion zone and to propagate said zone through said stratum toward said input well, whereby a major portion of the in-place oil present at said combustion zone and not utilized in completely consuming said oxygen becomes vaporized by the heat of the combustion and flows in vapor form to said output well through the portion of said stratum previously heated by the passage of said combustion zone, and cooling and recovering the fluids entering said producing well from said stratum.

4. The method of recovering, from an underground gas-permeable stratum in which it occurs, oil which is substantially not displaceable by gas flow, said stratum being penetrated by at least two spaced wells respectively adapted for use as an input well and a producing well, which method comprises the steps of initiating a combustion zone within said stratum at the bore of said producing well, intermittently supplying an oxygen-containing gas through said input well and thence through said stratum to said combustion zone to intermittently support combustion and to propagate said zone intermittently toward said input well, the periods of time intervening between the intermittent periods of injection of oxygen-containing gas being of sufficient length to permit a substantial portion of the heat generated during each period of injection to move by conduction through said stratum toward said input well, whereby a substantial portion of the in-place oil present at said combustion zone and not utilized in completely consuming said oxygen becomes vaporized by the heat of the combustion and by the heat flowing by conduction through the stratum and flows in vapor form to said output well through the portion of said stratum previously heated by said combustion zone, and cooling and recovering the fluids entering said producing well from said stratum.

5. The method according to claim 4 wherein the periods of oxygen injection and of heat conduction are of approximately equal length.

References Cited in the file of this patent

UNITED STATES PATENTS

| | | |
|---|---|---|
| 2,390,770 | Barton et al. | Dec. 11, 1945 |
| 2,584,605 | Merriam et al. | Feb. 5, 1952 |
| 2,695,163 | Pearce et al. | Nov. 23, 1954 |